United States Patent
Kuhlbach

(10) Patent No.: US 8,769,948 B2
(45) Date of Patent: Jul. 8, 2014

(54) EXHAUST GAS SYSTEM

(75) Inventor: Kai Sebastian Kuhlbach, Koeln-Merkenich (DE)

(73) Assignee: Ford Global Technologies, LLC, Dearborn, MI (US)

(*) Notice: Subject to any disclaimer, the term of this patent is extended or adjusted under 35 U.S.C. 154(b) by 1179 days.

(21) Appl. No.: 12/706,307

(22) Filed: Feb. 16, 2010

(65) Prior Publication Data

US 2011/0041498 A1    Feb. 24, 2011

(30) Foreign Application Priority Data

Feb. 18, 2009  (DE) .......................... 10 2009 000 962

(51) Int. Cl.
*F02D 23/00*      (2006.01)
*F02B 37/02*      (2006.01)
*F02B 37/22*      (2006.01)
*F02F 1/42*       (2006.01)

(52) U.S. Cl.
CPC ............... *F02F 1/4264* (2013.01); *F02B 37/02* (2013.01); *Y02T 10/144* (2013.01); *F02B 37/22* (2013.01); *F02B 37/025* (2013.01)
USPC ............................. 60/602; 415/150; 415/151

(58) Field of Classification Search
USPC .............................. 60/602, 312; 415/150, 151
See application file for complete search history.

(56) References Cited

U.S. PATENT DOCUMENTS

| | | | | |
|---|---|---|---|---|
| 3,137,477 A | * | 6/1964 | Kofink ........................... | 415/166 |
| 94,868 A | * | 9/1969 | Chase ............................ | 415/123 |
| 3,552,876 A | * | 1/1971 | Updike ......................... | 415/205 |
| 3,579,981 A | * | 5/1971 | Gau ................................ | 60/324 |
| 3,946,558 A | * | 3/1976 | Beekhuis, Jr. .................. | 60/274 |
| 4,008,572 A | * | 2/1977 | Woollenweber, Jr. .......... | 60/602 |
| 4,143,994 A | * | 3/1979 | Yamaguchi .................... | 415/205 |
| 4,177,006 A | * | 12/1979 | Nancarrow .................... | 415/151 |

(Continued)

FOREIGN PATENT DOCUMENTS

| | | | | |
|---|---|---|---|---|
| DE | 4202080 A1 | * | 7/1993 | ............. F01D 17/14 |
| DE | 102007057310 A1 | * | 6/2009 | ................ F02F 1/24 |

(Continued)

OTHER PUBLICATIONS

Machine Translation of FR-2649756, Machine Translated on Jul. 11, 2013.*

(Continued)

*Primary Examiner* — Thomas Denion
*Assistant Examiner* — Patrick Maines
(74) *Attorney, Agent, or Firm* — Julia Voutyras; Brooks Kushman P.C.

(57) ABSTRACT

An exhaust gas system configured for an internal combustion engine includes a cylinder head having at least two cylinders, a single exhaust duct emerging from the cylinder head, an individual exhaust duct provided between each cylinder and the single exhaust duct, and a reservoir of fixed volume integrated in the cylinder head and coupled to the single exhaust duct via a connecting duct. A reservoir valve is provided in the connecting duct in some embodiments. According to one embodiment, a method is disclosed in which the reservoir valve is commanded to an open position when flow through the single exhaust duct is large and commanded to a closed position when flowrate through the single exhaust duct is small. In some embodiments, a turbine, with a selectable volume upstream of the impeller, is coupled to the cylinder head.

19 Claims, 2 Drawing Sheets

(56) References Cited

U.S. PATENT DOCUMENTS

| | | | |
|---|---|---|---|
| 4,389,845 A * | 6/1983 | Koike | 60/602 |
| 4,512,714 A * | 4/1985 | Kaesser | 415/151 |
| 4,519,211 A * | 5/1985 | Sedille et al. | 60/602 |
| 4,565,068 A * | 1/1986 | Schneider | 60/602 |
| 4,781,528 A * | 11/1988 | Hagita et al. | 415/151 |
| 4,799,856 A * | 1/1989 | Matsudaira et al. | 415/155 |
| 6,073,447 A * | 6/2000 | Kawakami et al. | 60/602 |
| 7,104,042 B2 * | 9/2006 | Pagot | 60/281 |
| 7,694,518 B2 * | 4/2010 | Whiting et al. | 60/602 |
| 7,730,878 B2 * | 6/2010 | Shieh et al. | 123/568.17 |
| 8,312,719 B2 * | 11/2012 | Kong et al. | 60/605.1 |
| 8,336,310 B2 * | 12/2012 | Kong et al. | 60/605.1 |
| 8,353,154 B2 * | 1/2013 | Jacques et al. | 60/302 |
| 2002/0026909 A1 * | 3/2002 | Akiwa et al. | 123/41.82 R |
| 2006/0230759 A1 * | 10/2006 | Semrau | 60/602 |
| 2007/0209361 A1 * | 9/2007 | Pedersen et al. | 60/602 |
| 2007/0227142 A1 * | 10/2007 | Blaylock et al. | 60/600 |
| 2008/0011278 A1 * | 1/2008 | Yamagata | 123/562 |
| 2008/0022679 A1 * | 1/2008 | Hara et al. | 60/602 |

FOREIGN PATENT DOCUMENTS

| | | | | |
|---|---|---|---|---|
| FR | 2649756 A1 * | 1/1991 | | F01N 7/08 |
| FR | 2910536 A1 * | 6/2008 | | |
| JP | 62041917 A * | 2/1987 | | F01N 3/34 |
| JP | 2000179458 A * | 6/2000 | | F04B 39/00 |
| JP | 2001263232 A * | 9/2001 | | F04B 39/00 |
| JP | 2008190503 A * | 8/2008 | | |
| WO | 2008078020 A1 | 7/2008 | | |
| WO | 2008099758 A1 | 8/2008 | | |

OTHER PUBLICATIONS

Machine Translation of JP 62041917 A, Translated on Oct. 25, 2013.*

Office Action dated Jun. 5, 2013, for counterpart Chinese Application 201010119526.3.

* cited by examiner

EXHAUST GAS SYSTEM

CROSS-REFERENCE TO RELATED APPLICATIONS

This application claims foreign priority benefits under 35U.S.C. §119-(a)-(d) to DE 10 2009 000 962.0 filed Feb. 18, 2009, which is hereby incorporated by reference in its entirety.

BACKGROUND

1. Technical Field

The disclosure relates to a cylinder head having a turbine with a selectable volume in the exhaust system.

2. Background Art

Internal combustion engines have a cylinder block with pistons reciprocating therein. Combustion chambers are defined by a top of the piston, the cylinder walls, and a cylinder head coupled to the cylinder block.

The cylinder head conventionally has a valve train to control ingress of fresh charge through intake valves to displace the exhaust gases in the combustion chamber. Exhaust gases discharge through exhaust valves into exhaust ports and through exhaust ducts.

SUMMARY

An exhaust gas system configured for an internal combustion engine is disclosed. The cylinder head has at least two cylinders and a single exhaust duct emerging from the cylinder head. A turbine is coupled to the single exhaust duct. The turbine has: a turbine inlet duct coupled to a short spiral duct and a long spiral duct and a turbine valve disposed between the turbine inlet duct and the spiral ducts. The turbine valve has a first position in which flow from the turbine inlet duct is conducted to the short spiral duct and a second position in which flow from the turbine inlet duct is conducted to the long spiral duct. In one embodiment, the turbine valve is commanded to assume the first position when the flowrate through the single exhaust duct is below a predetermined flowrate and the turbine valve is commanded to assume the second position when the flowrate through the single exhaust duct is above the predetermined flowrate. In one embodiment, an electronic control unit is electronically coupled to the turbine valve, the electronic control unit commanding the turbine valve to the first position when flowrate through the single exhaust duct is small and commanding the turbine valve to the second position when flowrate through the single exhaust duct is large.

The system may also include an individual exhaust duct provided between each cylinder and the single exhaust duct, a reservoir of fixed volume integrated in the cylinder head and coupled to the single exhaust duct via a connecting duct, and a reservoir valve disposed in the connecting duct. The turbine valve has a first position in which flow from the turbine inlet duct is conducted to the short spiral duct. The turbine valve has a second position in which flow from the turbine inlet duct is conducted to the long spiral duct. The turbine valve is commanded to assume the first position and the reservoir valve is closed when the flowrate through the single exhaust duct is below a predetermined flowrate. The turbine valve is commanded to assume the second position and the reservoir valve is opened when the flowrate through the single exhaust duct is above the predetermined flowrate.

Also disclosed is a cylinder head, having at least two cylinders, an individual exhaust duct coupled to each cylinder and a combined exhaust duct coupling all individual exhaust ducts and emerging from the cylinder head. A reservoir of fixed volume is disposed in the cylinder head and coupled to the combined exhaust duct having: a connecting duct coupling the reservoir to the combined exhaust duct. A valve is disposed in the connecting duct. An electronic control unit is electronically coupled to the valve. The electronic control unit commands the valve to open when flowrate through the combined exhaust duct is large and commands the valve to close when flowrate through the combined exhaust duct is small. Alternatively, the electronic control unit commands the valve to open when an engine to which the cylinder head is coupled is operating at a high engine speed and to close when the engine is operating at a low engine speed. The valve is opened when an exhaust gas flowrate through the combined exhaust duct is large and is closed when an exhaust gas flowrate through the combined exhaust duct is small. The connecting duct has a particular cross-sectional area, which can serve as an orifice for affecting pressure pulsations in the exhaust gas system.

A method to control valves in an exhaust gas system includes opening a reservoir valve disposed in a connecting duct between a combined exhaust duct and a reservoir in response to flowrate through the combined exhaust duct exceeding a predetermined flowrate, the reservoir valve, the reservoir, and the combined exhaust duct all being disposed in a cylinder head. The method also includes closing the valve in response to the flowrate when the flowrate is less than the predetermined flowrate.

A turbine inlet duct is coupled to a downstream end of the combined exhaust duct, a turbine is coupled to the turbine inlet duct, the turbine having a short spiral duct and a long spiral duct, and a turbine valve is disposed in an upstream side of the turbine. The turbine valve has a first position that couples the turbine inlet duct with the short spiral duct and a second position that couples the turbine inlet duct with the long spiral duct. The method may further include commanding the turbine valve to the second position when the flowrate exceeds the predetermined flowrate. In one embodiment, the short spiral duct is coupled to a downstream end of the long spiral duct. Integrating the exhaust manifold into the cylinder head allows the turbine to be coupled closely to the cylinder head, which reduces thermal inertia in the exhaust gas system. At operating conditions with high flowrate, such as high engine speed and torque, the pressure pulses induced when exhaust valves open are intense. To dampen such pulses, the volume between the cylinders and the turbine is increased by opening up the reservoir valve and/or commanding the turbine valve to allow flow into the long spiral duct. At conditions with low flowrate, such as low engine speed and torque, the volume is descreased by closing off the reservoir valve and/or by commanded the turbine valve to conduct flow from the inlet of the turbine directly to the short spiral duct thereby facilitating fast response behavior of the turbine, which may be part of a turbocharger.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1A:
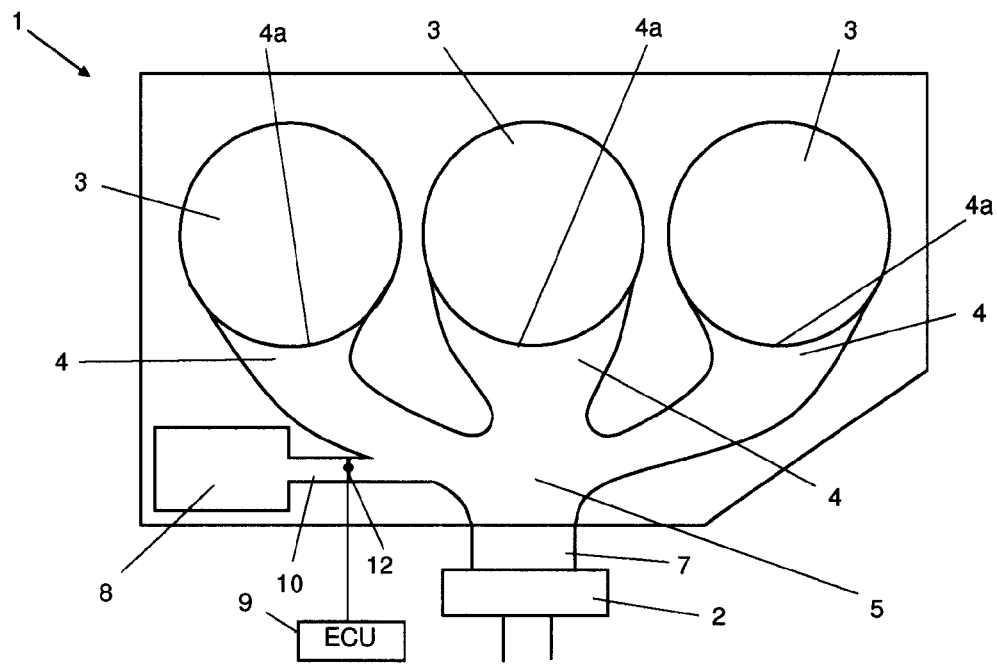
FIGS. 1a and 1b show schematics of a cylinder head including a reservoir, and an exhaust turbine according to embodiments of the disclosure.

In FIG. 1a, a cylinder head 1 having three cylinders 3 in an in-line arrangement is shown. Exhaust gases are evacuated from cylinders 3 through exhaust port(s) 4a, which couple to individual exhaust ducts 4. In one embodiment, each of cylinders 3 has one exhaust port coupled to individual exhaust duct 4. Alternatively, each of cylinders 3 has two or more exhaust ports which are joined to form individual exhaust duct 4, with one individual exhaust duct 4 associated with each cylinder 3. Individual exhaust ducts 4 merge to form a combined exhaust duct 5 within cylinder head 1 so as to form an integrated exhaust manifold. A turbine inlet duct 7 is coupled to combined exhaust duct 5. A turbine 2 is arranged in turbine inlet duct 7. In one embodiment, turbine 2 is directly adjacent to cylinder head 1, as facilitated by integrating the exhaust manifold in cylinder head 1, thereby facilitating a small volume in the exhaust system between turbine 2 and cylinders 3.

The embodiment in FIG. 1a has three cylinders 3. However, according to the disclosure, cylinder head 1 can have as few as two cylinders and no upper limit to the number of cylinders.

Figure 1B:
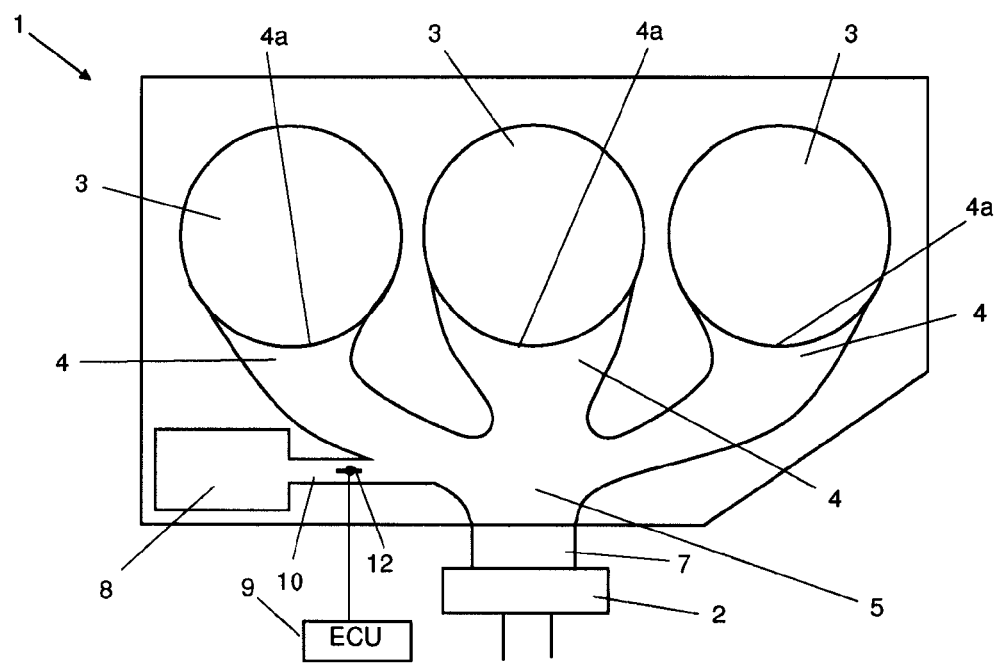

Continuing with FIG. 1a, a reservoir 8 is provided in cylinder head 1, with reservoir 8 coupled to combined exhaust duct 5 via connecting duct 10. A reservoir valve 12 is disposed in connecting duct 10 so that the total volume upstream turbine 2 is selectable. Reservoir 8 has a predetermined volume. A cross section of reservoir 8 is greater than the cross section of connecting duct 10. Valve 12 can be a flapper valve, a butterfly valve, a solenoid valve, or any suitable valve. In one embodiment, valve 12 has two states: fully closed, as shown in FIG. 1a, and fully open, as shown in FIG. 1b. Alternatively, valve 12 can assume a position an open position, a closed position, and positions in between. In one embodiment, valve 12 need not be capable of providing absolute gas-tight closure. Reservoir 8 can be coupled to an individual exhaust duct 4 or to combined exhaust duct 5. When valve 12 is open, exhaust volume upstream of turbine 2 is increased, which smooths pressure pulsations coming from exhaust blowdown from individual cylinders 3. In one embodiment, valve 12 is open when a large flowrate of exhaust gas is flowing to dampen pressure pulsations; and valve 12 is closed when a small flowrate of exhaust gas is flowing to thereby reduce turbine lag. A larger flowrate of exhaust gas flow is associated with high engine speed and torque conditions and a lesser flowrate of exhaust gas flow is associated with low engine speed and torque. Valve 12 is electronically coupled to an electronic control unit 9.

Figure 2A:
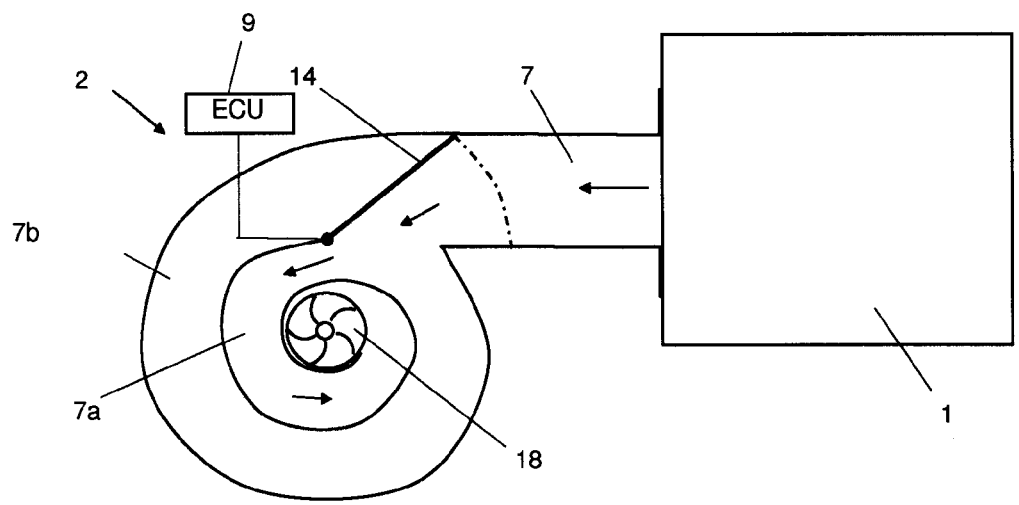
FIGS. 2a and 2b show schematics of a cylinder head and an exhaust turbine according to embodiments of the disclosure.
Figure 2B:
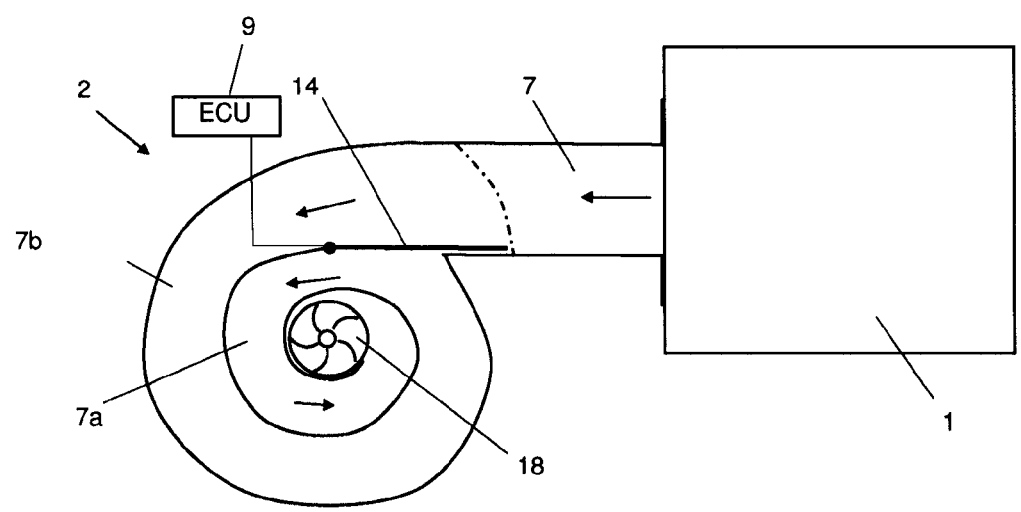

Referring now to FIG. 2a, a turbine 2 is shown coupled to turbine inlet duct 7. In one embodiment, turbine inlet duct 7 is a discrete element; in another embodiment, external exhaust duct is integral with turbine 2. In one embodiment, turbine 2 is mechanically coupled to a compressor (not shown) to form a turbocharger. Turbine inlet duct 7 leads to short spiral duct 7a and long spiral duct 7b. Short spiral duct 7a supplies exhaust gases to impeller 18. A turbine valve 14 is provided in turbine inlet duct 7, which as shown in FIG. 2a, causes the exhaust gases to bypass long spiral duct 7b and enter short spiral duct 7a directly. In FIG. 2b, valve 14 causes exhaust gases to flow through long spiral duct 7b before entering short spiral duct 7a. For the position of valve 14 shown in FIG. 2b, the flow path is considerably longer than the position of valve 14 in FIG. 2a. The exhaust volume upstream of turbine 2 is affected by the position of valve 14. Valve 14 is shown as a flapper valve which pivots about a point at which it is affixed. Any suitable valve can be used in place of valve 14.

The position of valve 14 that is shown in FIG. 2a is suitable for small gas flowrates. The position of valve 14 that is shown in FIG. 2b is suitable for large gas flowrates. Valve 14 is electronically coupled to an electronic control unit 9.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A cylinder head, comprising:
   at least two cylinders;
   an individual exhaust duct coupled to each cylinder;
   a combined exhaust duct coupling all individual exhaust ducts wherein the combined exhaust duct emerges from the cylinder head; and
   a reservoir having a single inlet/outlet disposed entirely within the cylinder head and coupled to the combined exhaust duct.

2. The cylinder head of claim 1, further comprising: a connecting duct coupling the single inlet/outlet of the reservoir to the combined exhaust duct.

3. The cylinder head of claim 2, further comprising: a valve disposed in the connecting duct.

4. The cylinder head of claim 3, further comprising:
   an electronic control unit electronically coupled to the valve wherein the electronic control unit commands the valve to open when flowrate through the combined exhaust duct is large and commands the valve to close when flowrate through the combined ehxuast duct is small.

5. The cylinder head of claim 3, further comprising:
   an electronic control unit electronically coupled to the valve wherein the electronic control unit commands the valve to open when an engine to which the cylinder head is coupled is operating at a high engine speed and to close when the engine is operating at a low engine speed.

6. The cylinder head of claim 3 wherein the valve is opened when an exhaust gas flowrate through the combined exhaust duct is large and is closed when an exhaust gas flowrate through the combined exhaust duct is small.

7. An exhaust gas system configured for an internal combustion engine, the exhaust system comprising:
   a cylinder head having at least two cylinders;
   a single exhaust duct emerging from the cylinder head;
   an individual exhaust duct provided between each cylinder and the single exhaust duct; and
   a reservoir having a single inlet/outlet integrated in the cylinder head and coupled to the single exhaust duct via a connecting duct.

8. The system of claim 7, further comprising:
   a reservoir valve disposed in the connecting duct; and
   an electronic control unit coupled to the reservoir valve wherein the electronic control unit commands the reservoir valve to close when flow through the single exhaust duct is small and commands the turbine valve to open when flow through the single exhaust duct is large.

9. The system of claim 7, further comprising:
   a reservoir valve disposed in the connecting duct; and
   an electronic control unit coupled to the reservoir valve wherein the electronic control unit commands the reservoir valve to close when an engine to which the exhaust gas system is coupled is operating at high engine speed and commands the turbine valve to open the engine is operating at low engine speed.

10. The system of claim 7, further comprising:
    a reservoir valve disposed in the connecting duct; and
    an electronic control unit coupled to the reservoir valve wherein the electronic control unit commands the reservoir valve to close when an engine to which the exhaust gas system is coupled is operating at high engine speed and high engine torque and commands the turbine valve to open the engine is operating at low engine speed and high engine torque.

11. The system of claim 7 wherein the connecting duct has a cross-sectional area less than a cross-sectional area of the reservoir.

12. The system of claim 7, further comprising:
    a turbine coupled to the single exhaust duct, the turbine comprising:
      a turbine inlet duct;
      an impeller
      a short spiral duct located upstream of the impeller;
      a long spiral duct located upstream of the short spiral duct; and
      a turbine valve located upstream of the short spiral duct.

13. The system of claim 12 wherein the turbine valve has a first position in which flow from the turbine inlet duct is conducted to the short spiral duct and a second position in which flow from the turbine inlet duct is conducted to the long spiral duct.

14. The system of claim 13 further comprising an electronic control unit coupled to the turbine valve, the electronic control unit commanding the turbine valve to the first position when flowrate through the single exhaust duct is small and commanding the turbine valve to the second position when flowrate through the single exhaust duct is large.

15. A method to control an exhaust gas system, the method comprising:
    opening a reservoir valve disposed in a connecting duct between a combined exhaust duct and a reservoir in response to flowrate through the combined exhaust duct exceeding a predetermined flowrate, the reservoir valve, the reservoir, and the combined exhaust duct all being fluidly coupled in a cylinder head.

16. The method of claim 15, further comprising:
    closing the reservoir valve in response to the flowrate being less than the predetermined flowrate.

17. The method of claim 15 wherein:
    a turbine inlet duct is coupled to a downstream end of the combined exhaust duct;
    a turbine is coupled to the turbine inlet duct, the turbine having a short spiral duct and a long spiral duct; and
    a turbine valve is disposed in an upstream side of the turbine, the turbine valve having a first position that couples the turbine inlet duct with the short spiral duct and a second position that couples the turbine inlet duct with the long spiral duct, the method further comprising:
    commanding the turbine valve to the second position when the flowrate exceeds the predetermined flowrate.

18. The method of claim 17 wherein the short spiral duct is coupled to a downstream end of the long spiral duct.

19. The method of claim 15 wherein:
    a turbine inlet duct is coupled to a downstream end of the combined exhaust duct;
    a turbine is coupled to the turbine inlet duct, the turbine having a short spiral duct and a long spiral duct; and
    a turbine valve is disposed in an upstream side of the turbine, the turbine valve having a first position that couples the turbine inlet duct with the short spiral duct and a second position that couples the turbine inlet duct with the long spiral duct, the method further comprising:
    commanding the turbine valve to the first position when the flowrate is less than the predetermined flowrate.

\* \* \* \* \*